Oct. 10, 1961  N. J. CEDRONE  3,003,942
ELECTROLYTIC CELL FOR RECOVERY OF SILVER FROM
SPENT PHOTOGRAPHIC FIXING BATHS
Filed Dec. 16, 1954
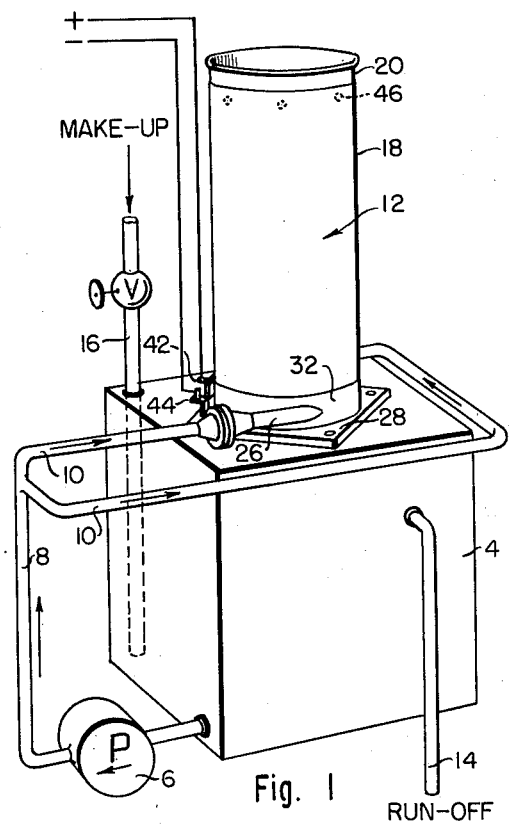
Fig. 1
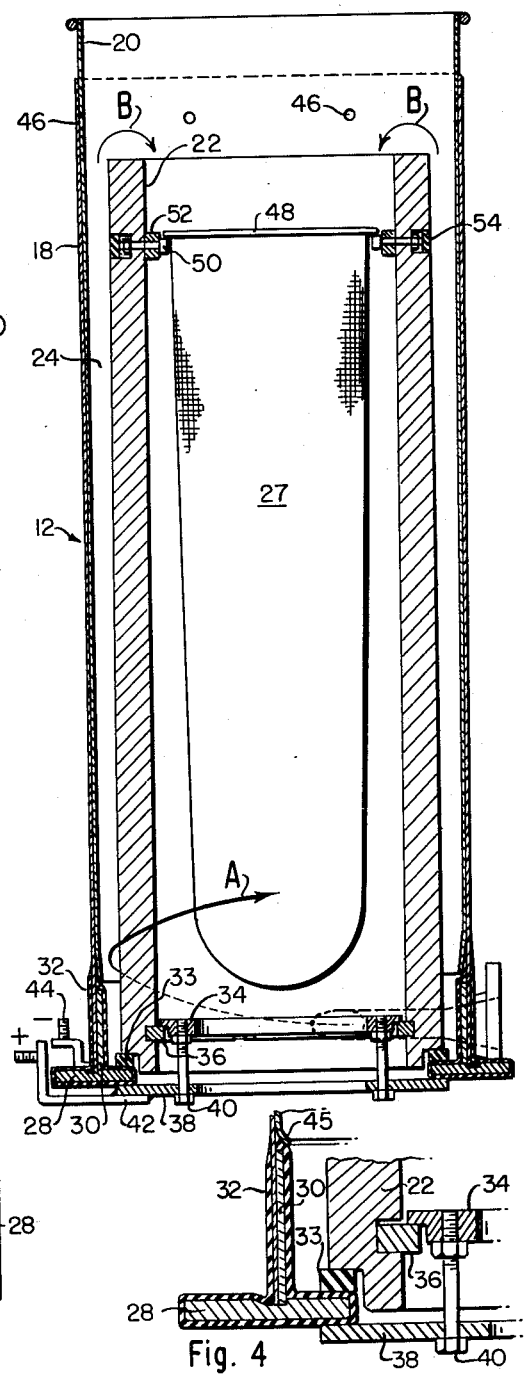
Fig. 2
Fig. 3
Fig. 4

3,003,942
ELECTROLYTIC CELL FOR RECOVERY OF SILVER FROM SPENT PHOTOGRAPHIC FIXING BATHS
Nicholas J. Cedrone, Needham Heights, Mass., assignor to Hispeed Equipment Inc., New York, N.Y., a corporation of New York
Filed Dec. 16, 1954, Ser. No. 475,639
2 Claims. (Cl. 204—272)

The present invention relates to method and apparatus for treating spent photographic baths and is more particularly concerned with methods and apparatus for recovering silver from spent fixing solutions.

In normal photographic processing the fixing bath, which comprises principally sodium thiosulfate, takes up silver to a maximum of about 5.0 grams per liter. It has long been recognized that the silver may be recovered electrolytically to a point where the bath contains about 1 gram of silver per liter. By this electrolytic action the hypo is also rejuvenated so that it can be used again.

In the treatment of spent fixing solutions it has also been recognized that the solution must be kept in motion; otherwise the silver is precipitated in the form of a sulfide. Various expedients have been used to promote turbulence in the bath while the electrolytic action is carried on, but these devices have proved to be cumbersome and expensive, and in general silver recovery has not proved feasible except in large-scale operations.

The principal object of the present invention is to provide a simple, inexpensive and easily operated method and apparatus for treating spent photographic solutions, which is available for economic operation on quantities of substantially any size.

With this object in view the present invention comprises the method and apparatus hereinafter described and particularly defined in the claims.

In the accompanying drawings FIG. 1 is a semi-diagrammatic perspective view of the preferred form of apparatus according to the present invention;

FIG. 2 is a sectional elevation of the recovery cell;

FIG. 3 is a plan view of the recovery cell; and

FIG. 4 is a detail view on an enlarged scale.

The illustrated embodiment of the invention comprises a tank 4 adapted to contain spent hypo. The hypo is continuously circulated from the bottom of the tank by a pump 6 through a line 8 and branch lines 10 into the bottom of a recovery cell 12 of a type to be described in detail presently. The construction is such that the solution is circulated from the tank 4 into the cell 12 and back into the tank until the required degree of purification has taken place. A draw-off 14 and a make-up pipe 16 are provided. The operation may be in a batch, or in semi-continuous fashion involving a draw-off at 14 and a make-up at 16.

The cell 12, which is shown on an enlarged scale in FIGS. 2 and 3, comprises an outer shell 18, preferably of stainless steel, supporting an internal metal cathode 20 which slides within the shell 18. The cathode 20 is in the form of a sleeve and it is of a material on which the silver will plate out but from which it may be rmoved mechanically after drying, the preferred material being stainless steel. Opposed to the cathode is a carbon anode 22. The means by which the members are supported will presently be described in detail. For the present it suffices to note that a current is passed between the anode 22 and the cathode 20 while the liquid circulates in the space 24 between the electrodes.

At the bottom of the cell 12 there are provided two tangential inlet members 26 to which the branch pipes 10 are connected. As indicated by the arrow A near the bottom of FIG. 2, the fluid is pumped through the inlets 26 into the inter-electrode space where it whirls with a helical motion and rises to cascade over the top of the anode 22 as indicated by the arrows B.

The liquid after passing over the top of the anode 22 descends through a filter bag 27 where sludge and other solids are removed. The liquid which passes out through the filter bag drops into the tank 4.

As shown in FIGS. 3 and 4, the cell is provided at the bottom with a flange 28 which is received on the top of the tank 4. The outer sleeve 18 is welded to the flange 28, and an inner fixed sleeve 30 of small height is also welded to the sleeve 18. The bottom part of the sleeve 18, the entire surface of the flange 28, and the inner fixed sleeve 30 are completely covered by an insulating compound 32, preferably one which is of tough plastic character, such as neoprene. The lower part of the carbon anode 22 is formed with a shoulder resting on an insulating ring 33 of material such as neoprene, which in turn is supported on the flange 28. A locking ring 34 is mounted on a metal supporting ring 36 which is received in a groove in the inner wall of the anode 22; for convenience in assembly the ring 36 is preferably formed of three segments which can be readily inserted into the groove. A lower locking ring 38 lies against the under side of the covered flange 28. The two rings 36 and 38 are securely held together by bolts 40, thereby mechanically securing the carbon anode 22 in place. Also this construction provides for the terminal for introducing current to the anode. To this latter end a terminal member 42 is welded to the under side of the lower locking ring 38. The negative terminal member 44 is connected directly with the outer sleeve 18. The openings in the rings 36 and 38 overlie an opening in the top of the tank 4, so that liquid passing through the filter drops into the tank.

As heretofore stated, the cathode 20 is a cylinder which is slidingly received within the sleeve 18. It is preferably formed with a slight taper over its full length. The lower end portion of the cathode 20 is preferably curved inwardly to a slight extent (as indicated at 45 in FIG. 4) to prevent its damaging the neoprene covering 32. The cathode is provided near the top with a ring of weep holes 46 to break the capillary rise of liquid between the shell and the cathode liner.

The filter bag 27 is supported in the following manner: it has at the top a metal ring 48 adapted to be supported on the heads of bolts 50 secured to the anode 22. In order to permit easy removal of the filter bag, each bolt is provided with a spacer 52, and the diameter of the ring 48 is somewhat less than the inside diameter of the anode. Therefore an annular space is left between the bag and the anode which provides an overflow if the filter cannot accommodate the flow. Owing to the high velocity of the cascading liquid substantially all of the liquid passes into the bag without falling through the annular space. As shown in FIG. 2, the nuts on the bolts 50 are received in counterbores of the anode which are closed by plugs 54 of rubber or other insulating material.

In operation the pump, as heretofore noted, circulates fluid from the tank through the recovery cell. As the fluid enters the inlets 26, it has a high velocity and it circulates rapidly in the annular space 24 between the electrodes between which a direct current is passed. The fluid has a high linear rate of flow due to its helical motion, but it has a relatively low rate of mass flow and therefore it is subjected to an extended electrolytic action during its passage upwardly through the cell. The high linear rate of flow promotes the turbulence which is essential to prevent precipitation of the silver in the form of sulfide. Furthermore, it exerts a scrubbing action on the inside of the liner 20 and serves to promote a pure fine grain silver deposit. The result is that substantially pure silver is plated out on the cathode 20. The filter bag serves to collect any sludge.

After a sufficient amount of silver has been plated out, the circulation is stopped and the cathode liner 20 is removed. Upon drying, the silver deposit on the cathode 20 may be caused to flake off under light tapping since silver does not permanently plate to stainless steel. The filter bag 26 may be removed and cleaned. The liquid in the tank 4 is rejuvenated by the electrolytic action. For small operations, a batch process is usually satisfactory, but for large-scale operations, it is preferable to operate in a semi-continuous fashion, with make-up introduced at 16, so that rejuvenated hypo runs off at 14; the continuity of operation needs to be disturbed only for cleaning and for removal of the plated silver.

Although the principle of helical flow may be attained with either polarity external, the preferred arrangement is with the cathode external, not only for constructional reasons, but also because, as is well known, when a liquid flows in a curved path, its highest velocity is at the outer radius, thereby contributing to the high velocity action against the cathode. Although the preferred form of the invention has been shown and described, it may be varied in a manner which will be clear to those skilled in the art, from the foregoing description.

Having thus described the invention, I claim:

1. An electrolytic cell for recovery of silver from a spent photographic fixing bath comprising a cylindrical anode, a cylindrical cathode surrounding the anode, an upstanding sleeve of small height relative to the anode and surrounding the bottom portion of the anode, a horizontal flange extending inwardly from the sleeve below the anode, means for supporting the anode on the flange and for insulating it therefrom, means for securing the anode and the flange in a rigid relationship, said securing means comprising two locking rings, means for mounting one locking ring internally of the anode and the other below the flange, and means for rigidly connecting the locking rings together, a tangential liquid inlet member secured to the sleeve to introduce fixing solution into the annular space between the sleeve and the anode, the cathode being of a material on which silver plates out but to which silver does not adhere, means for removably mounting the cathode in electrically conducting relation to the sleeve, and terminal means connected with the sleeve and with the anode.

2. An electrolytic cell for recovery of silver from a spent photographic fixing bath comprising a cylindrical anode, a cylindrical cathode surrounding the anode, the anode being of shorter height than the cathode, an upstanding sleeve of small height relative to the anode and surrounding the bottom portion of the anode, a horizontal flange extending inwardly from the sleeve below the anode, means for supporting the anode on the flange and for insulating it therefrom, means providing for discharge of liquid downwardly from the interior of the anode, means for securing the anode and the flange in a rigid relationship, a tangential liquid inlet member secured to the sleeve to introduce fixing solution into the annular space between the sleeve and the anode, the cathode being of a material on which silver plates out but to which silver does not adhere, means for removably mounting the cathode in electrically conducting relation to the sleeve, terminal means connected with the sleeve and with the anode, a filter bag, and means for removably supporting the filter bag near the top of the anode to receive liquid which cascades over the top of the anode from the inter-electrode space.

References Cited in the file of this patent

UNITED STATES PATENTS

| | | |
|---|---|---|
| 1,954,316 | Hickman | Apr. 10, 1934 |
| 2,431,948 | Martz | Dec. 2, 1947 |
| 2,583,101 | Oliver | Jan. 22, 1952 |

FOREIGN PATENTS

| | | |
|---|---|---|
| 879,284 | France | Nov. 10, 1942 |
| 491,453 | Canada | Mar. 24, 1953 |